United States Patent
Lehman et al.

(10) Patent No.: US 12,397,469 B2
(45) Date of Patent: Aug. 26, 2025

(54) HONEYCOMB EXTRUSION DIES AND METHODS OF USING AND MAKING SAME

(71) Applicant: CORNING INCORPORATED, Corning, NY (US)

(72) Inventors: Michael James Lehman, Canisteo, NY (US); Min Shen, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 159 days.

(21) Appl. No.: 18/288,044

(22) PCT Filed: May 18, 2022

(86) PCT No.: PCT/US2022/029735
§ 371 (c)(1),
(2) Date: Oct. 24, 2023

(87) PCT Pub. No.: WO2022/251010
PCT Pub. Date: Dec. 1, 2022

(65) Prior Publication Data
US 2024/0190043 A1    Jun. 13, 2024

Related U.S. Application Data

(60) Provisional application No. 63/193,764, filed on May 27, 2021.

(51) Int. Cl.
*B28B 3/26*     (2006.01)
(52) U.S. Cl.
CPC .................................. *B28B 3/269* (2013.01)
(58) Field of Classification Search
CPC ..... B28B 3/269; B29C 48/11; B29C 48/3001; B29C 48/3003; B23P 15/243; B30B 11/221
See application file for complete search history.

(56) References Cited

U.S. PATENT DOCUMENTS

| 6,080,348 A | * | 6/2000 | Shalkey | .................. B28B 3/269 264/630 |
| 6,299,813 B1 | * | 10/2001 | Brew | ...................... B28B 3/269 264/209.8 |

(Continued)

FOREIGN PATENT DOCUMENTS

| EP | 2890535 B1 | 2/2019 | |
| WO | WO-2017087758 A1 * | 5/2017 | ........... B30B 11/221 |

(Continued)

OTHER PUBLICATIONS

International Search Report and Written Opinion of the International Searching Authority; PCT/US2022/029735; dated Sep. 6, 2022; 12 pages; European Patent Office.

*Primary Examiner* — Xiao S Zhao
*Assistant Examiner* — Inja Song
(74) *Attorney, Agent, or Firm* — Kevin M. Able (57) ABSTRACT

A honeycomb extrusion die (120) with improved wear properties. Extrusion die has a die body (121) with inlet (122) and exit (123) faces, feedholes (124) with feedhole entrances (124A) and outlets (124B), and a plurality of die pins (126) having side surfaces (128) configured to define a matrix of intersecting slots (130). At least some of the intersecting slots and die pins define a slot structure with divots (132) formed in the side surfaces of the die pins between the feedholes and the exit face, entrance slot portions between the feedhole outlets and the divots, the entrance slot portions having an entrance slot width $W_A$, and exit slot portions between the divots and the exit face, the exit slot portions having an exit slot width $W_B$, wherein $W_A > W_B$ over an entire slot length. Methods of manufacturing honeycomb structures using the honeycomb extrusion dies and of fabricating the extrusion dies are provided as are other aspects.

20 Claims, 6 Drawing Sheets

(56) References Cited

U.S. PATENT DOCUMENTS

| | | | |
|---|---|---|---|
| 6,413,072 B1 | 7/2002 | Brew et al. | |
| 6,558,151 B1 | 5/2003 | Kragle | |
| 6,989,119 B2 | 1/2006 | Bernas et al. | |
| 2010/0301515 A1* | 12/2010 | Brew | B29C 48/11 |
| | | | 425/467 |
| 2015/0086670 A1* | 3/2015 | Kitamura | B23P 15/243 |
| | | | 425/461 |
| 2017/0120498 A1* | 5/2017 | Brew | B30B 11/221 |
| 2019/0047174 A1* | 2/2019 | Deming | B28B 3/269 |

FOREIGN PATENT DOCUMENTS

| | | | | |
|---|---|---|---|---|
| WO | WO-2019125830 A1 * | 6/2019 | | B01J 35/57 |
| WO | 2023/009374 A1 | 2/2023 | | |

* cited by examiner

```
                                    ┌─ 800
                                    ▼
┌─────────────────────────────────────────────────────────┐
│   Providing A Honeycomb Extrusion Die Having A Die Body │
│   Comprising An Inlet Face And An Exit Face, The Die Body│
│  Having Feedholes With Feedhole Entrances Located At The │
│ Inlet Face And Feedhole Outlets, And A Plurality Of Die Pins│
│   Extending A Distance Into The Exit Face, The Plurality Of│
│    Die Pins Comprising Side Surfaces Configured To Define A│
│   Matrix Of Intersecting Slots, At Least Some Of The Matrix│
│   Of Intersecting Slots And The Plurality Of Die Pins Further│
│                         Comprising:                       │
│      Divots Formed In The Side Surfaces Of The Die Pins   │──── 802
│  Between The Feedholes And The Exit Face,                 │
│      Entrance Slot Portions Of The Matrix Of Intersecting │
│  Slots Between The Feedhole Outlets And The Divots, The   │
│  Entrance Slot Portions Having An Entrance Slot Width $W_A$,│
│  And                                                      │
│      Exit Slot Portions Of The Matrix Of Intersecting Slots│
│  Between The Divots And The Exit Face, The Exit Slot      │
│  Portions Having An Exit Slot Width $W_B$, Wherein $W_A > W_B$│
│  Over An Entire Length $L_B$ From The Feedhole Outlets To The│
│  Divots                                                   │
└─────────────────────────────────────────────────────────┘
                                    │
                                    ▼
┌─────────────────────────────────────────────────────────┐
│   Extruding A Batch Material Through The Feedholes And   │──── 804
│              Matrix Of Intersecting Slots                │
└─────────────────────────────────────────────────────────┘
```

FIG. 8

HONEYCOMB EXTRUSION DIES AND METHODS OF USING AND MAKING SAME

CROSS REFERENCE TO RELATED APPLICATION

This is a national stage application under 35 U.S.C. § 371 of International Application No. PCT/US2022/029735, filed on May 18, 2022, which claims the benefit of priority under 35 U.S.C. § 119 of U.S. Provisional Application Ser. No. 63/193,764 filed on May 27, 2021, the content of which is relied upon and incorporated herein by reference their entireties.

FIELD

Embodiments of the disclosure relate to honeycomb extrusion dies, and in particular to honeycomb extrusion dies comprising slots with divots extending into side surfaces of the slots and methods of using such honeycomb extrusion dies to manufacture honeycomb structures.

BACKGROUND

Honeycomb extrusion dies can be used to extrude honeycomb structures from ceramic-forming batch materials, which after firing, may produce porous honeycomb structures that can be utilized in fluid treatment systems, such as catalytic converters and particulate filters, for example.

SUMMARY

An example embodiment of the disclosure provides a honeycomb extrusion die. The honeycomb extrusion die comprises a die body comprising an inlet face and an exit face, the die body having feedholes with feedhole entrances at the inlet face and feedhole outlets, and a plurality of die pins extending to the exit face, the plurality of die pins comprising side surfaces configured to define a matrix of intersecting slots, at least some of the matrix of intersecting slots and the plurality of die pins further comprising: divots formed in the side surfaces of the die pins between the feedholes and the exit face, entrance slot portions of the matrix of intersecting slots between the feedhole outlets and the divots, the entrance slot portions having an entrance slot width $W_A$, and exit slot portions of the matrix of intersecting slots between the divots and the exit face, the exit slot portions having an exit slot width $W_B$, wherein $W_A > W_B$ over an entire length from the feedhole outlets to the divots.

Another example embodiment of the disclosure provides a honeycomb extrusion die. The honeycomb extrusion die comprises a die body comprising an inlet face and an exit face, the die body having feedholes with feedhole entrances at the inlet face and feedhole outlets, and a plurality of die pins extending to the exit face, the plurality of die pins comprising side surfaces configured to define a matrix of intersecting slots, at least some of the matrix of intersecting slots and the plurality of die pins further comprising: divots formed in the side surfaces of the die pins between the feedholes and the exit face, entrance slot portions of the matrix of intersecting slots between the feedhole outlets and the divots, the entrance slot portions having an entrance slot width $W_A$, and exit slot portions of the matrix of intersecting slots between the divots and the exit face, the exit slot portions having an exit slot width $W_B$, wherein $W_A > W_B$ over an entire length from the feed hole exits to the divots, and wherein the at least some of the matrix of intersecting slots have SWCR of greater than or equal to 1.5, wherein SWCR is a slot width contraction ratio defined as $SWCR = W_A/W_B$, and wherein the at least some of the entrance slot portions have an entrance length $L_A$ as measured between the feed hole outlets and the divots, and at least some of the exit slot portions have an exit length $L_B$ as measured between the divots and the exit face, and wherein $L_A > L_B$.

Another example embodiment of disclosure provides a method of manufacturing a honeycomb structure. The method comprises providing a honeycomb extrusion die having a die body comprising: an inlet face and an exit face, the die body having feedholes with feedhole entrances at the inlet face and feedhole outlets, and a plurality of die pins extending to the exit face, the plurality of die pins comprising side surfaces configured to define a matrix of intersecting slots, at least some of the matrix of intersecting slots and the plurality of die pins further comprising: divots formed in the side surfaces of the die pins between the feedholes and the exit face, entrance slot portions of the matrix of intersecting slots between the feedhole outlets and the divots, the entrance slot portions having an entrance slot width $W_A$, and exit slot portions of the matrix of intersecting slots between the divots and the exit face, the exit slot portions having an exit slot width $W_B$, wherein $W_A > W_B$ over an entire length from the feedhole outlets to the divots; and extruding a batch material through the feedholes and matrix of intersecting slots. A position of maximum die wear from the extrusion is located at the exit slot portions of the matrix of intersecting slots, regardless of the rheology of the batch material.

Additional features of the disclosure will be set forth in the description which follows, and in part will be apparent from the description, or may be learned by practice of the disclosure. It is to be understood that both the foregoing general description and the following detailed description are explanatory and are intended to provide further explanation of the disclosure.

BRIEF DESCRIPTION OF THE DRAWINGS

The accompanying drawings, which are included to provide a further understanding of the disclosure are incorporated in and constitute a part of this specification, illustrate embodiments of the disclosure and together with the description serve to explain the disclosure. The drawings are not necessarily drawn to scale.

DETAILED DESCRIPTION

Honeycomb bodies are used in many different applications. For example, exhaust after-treatment systems of exhaust gas from internal combustion engines may use one or more catalysts supported on high-surface area substrates (e.g., ceramic honeycomb bodies) to reduce exhaust pollutants such as CO, HC, NOx, SOx, for example. Similarly, high porosity honeycomb bodies may be end plugged to for use as wall-flow honeycomb filters. Porous ceramic bodies useful as catalyzed flow-through honeycomb substrates and wall-flow honeycomb filters can be manufactured utilizing the honeycomb extrusion dies according to the embodiments described herein.

In particular, a honeycomb structure of a honeycomb body can be formed by extruding from a honeycomb extrusion die, a ceramic-forming batch mixture, comprising ceramic-forming materials that may comprise ceramics or ceramic precursors, or both, an organic binder(s), a liquid vehicle, an optional pore former, and possibly other processing aids, lubricants, or sintering aids. After green honeycomb formation (e.g., via extrusion through the honeycomb extrusion die), the green honeycomb body can be dried and reacted and/or sintered into a porous ceramic honeycomb body. The porous ceramic honeycomb body can have open and interconnected porous ceramic honeycomb macro- and microstructure suitable for exhaust after-treatment or other fluid treatment purposes. The ceramic material may be, for example, cordierite, aluminum titanate, alumina, mullite, silicon carbide, silicon nitride, and the like, and combinations thereof. Other suitable extrudable batch materials may be used.

Figure 2:
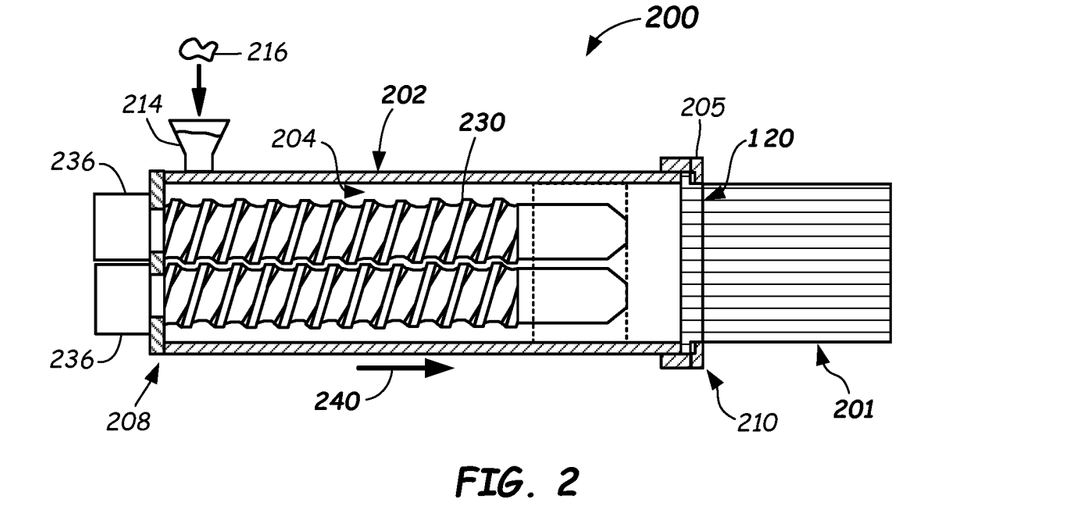
FIG. 2 schematically illustrates a partially cross-sectioned, side view diagram of an extruder (e.g., twin-screw extruder) including an extrusion die located at a discharge end according to embodiments of the disclosure.
Figure 3:
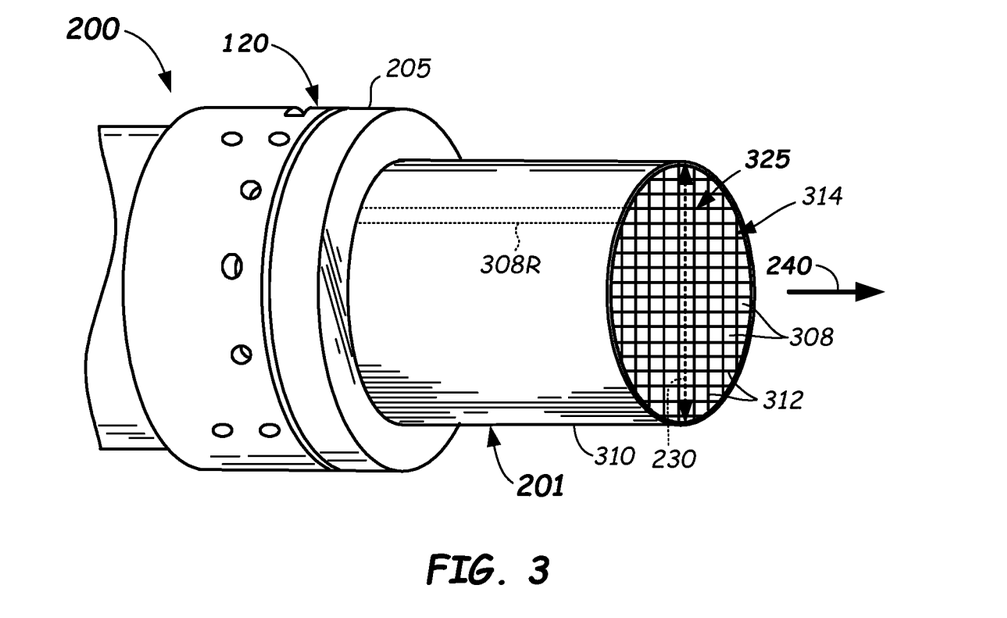
FIG. 3 schematically illustrates a perspective, partial view diagram of an extruder front end and a green honeycomb structure being extruded from a honeycomb extrusion die according to embodiments of the disclosure.

The extrusion can be performed using any suitable extruder, such as a hydraulic ram extrusion press, a two stage de-airing single auger extruder, a twin-screw extruder, and the like; each with a honeycomb extrusion die of an embodiment as described herein attached to the discharge end thereof, such as shown in FIGS. 2 and 3, for example.

As should be recognized, extrusion of such ceramic-forming batch mixtures through the honeycomb extrusion die subjects the honeycomb extrusion die to severe wear given the abrasive nature of the batch mixture being extruded. The amount of wear may be dependent on the properties and components of batch mixture and its corresponding liquid content. For example, more coarse batch mixtures (e.g., larger particle sizes) may cause more aggressive wear, and likewise dryer batches (containing less liquid) may cause more wear. Such honeycomb extrusion dies have tolerances and/or features that are desired be maintained during the useful life of the extrusion die. However at some point in the life of the extrusion die, these tolerances and/or features may become degraded to the point that desired honeycomb dimensions (e.g., honeycomb wall thickness) or features in the extruded bodies may no longer be obtained. Although honeycomb extrusion dies can be conventionally recoated with a suitable wear coating to extend their useful life, recoating can be expensive, and the extent of recoating is generally limited, as at some point the honeycomb extrusion die can no longer be used (e.g., once it has been excessively degraded from both use and the coating operations). Thus, extrusion die designs that assist in enabling improved wear characteristics and attributes may be effective in increasing the useful life of the honeycomb extrusion die. This can have significant impacts to the cost of manufacturing honeycomb bodies and to the quality of the resulting honeycomb bodies.

One goal in producing some honeycomb bodies is to minimize wall thickness variability, for example, as both the variance in the dimensions of the walls of a single honeycomb body, and also as variance in the dimensions of multiple honeycomb bodies made from the same die. For example, as an extrusion die wears, the width of the slots used to form the honeycomb walls can widen and become increasingly less uniform across the die. This variability, such as in the form of a slot width standard deviation, is one metric that may help to determine if a particular honeycomb extrusion die is still capable of producing a honeycomb body within acceptable dimensional tolerances or limits. In some cases, a honeycomb extrusion die may be rejected after extrusion of a certain linear footage of extruded green ware due to increases in slot width variability correlated to this linear footage. In other cases, the honeycomb extrusion die may be inspected by image-analysis software.

In addition to altering the dimensions, or the variability in the dimensions, of the extruded honeycomb, wearing of a die pin root (at the location where the feedholes insect with the slots) may significantly reduce the cross-sectional area of the attachment of the die pin to the die body, and thus reduce its area moment of inertia. This reduced area moment of inertia may lead to higher stresses when a die pin is subject to any bending moment, such as during extrusion, handling, and/or during die recoating. Particularly, non-uniform wear at the die pin root may lead to die pin movement during recoating due to the shape asymmetry of the coating and the die pin. Additionally, this asymmetry coupled with the difference in coefficient of thermal expansion (CTE) between the base material and wear coating, may cause further die pin deformation. This may result in even greater slot width variability.

Another contributor to slot width variability can be wear of the die pin sides at the exit of the slots, at which location the width of the extruded honeycomb walls are determined. For abrasive batches with high wall drag, the wear of the die may occur at the highest rate at the die pin root at the intersection of feedhole and slot. In accordance with the above, wear at the die root can lead to a premature ending of the die's life, e.g., prior to its expected linear footage.

While wear at the exits of the slots may eventually lead to unacceptably high slot width variability, extrusions processes are generally less sensitive to wear at the slot exits than to wear at the pin roots.

Although die wear is a generally unavoidable consequence of extrusion of abrasive batch materials, one advantage of the honeycomb extrusion die embodiments described herein is that the wear is reduced and the location of the wear is controlled so that it is in an area of the die that is less susceptible to corresponding dimensional variability in the extruded honeycomb bodies. That is, to improve honeycomb extrusion die life, in accordance with embodiments described herein, the die is arranged so that the highest rate of wear occurs at the slot exits, and this is accomplished regardless of batch mixture used, i.e., independent of the rheological characteristics of the batch mixture. For example, the inventors have discovered that less wall thickness variability occurs in the extruded honeycomb, and honeycomb extrusion die life can be extended, if the peak batch slip velocity (representing wear) at the intersection between the feedholes and slots is less than the batch slip velocity at the exit of the slots.

In addition to increased die life, the embodiments described herein also allow for lower die pressure due to less wear at the pin root enabling dies having comparatively wider slot widths at the intersections between the feedholes and the slots. In turn, lower die pressures may assist in enabling dies having longer feedhole lengths, which may reduce die crowning (and thus be particularly useful for larger diameter dies, which may undergo significant crowning during use). As described herein, the disclosed embodiments assist in providing a single design that yields consistent performance (e.g., location of highest wear) for all honeycomb extrusion dies regardless of batch rheology, e.g., regardless of whether the batch material is a so-called low wall-drag batch or a high wall-drag batch.

Figure 1:
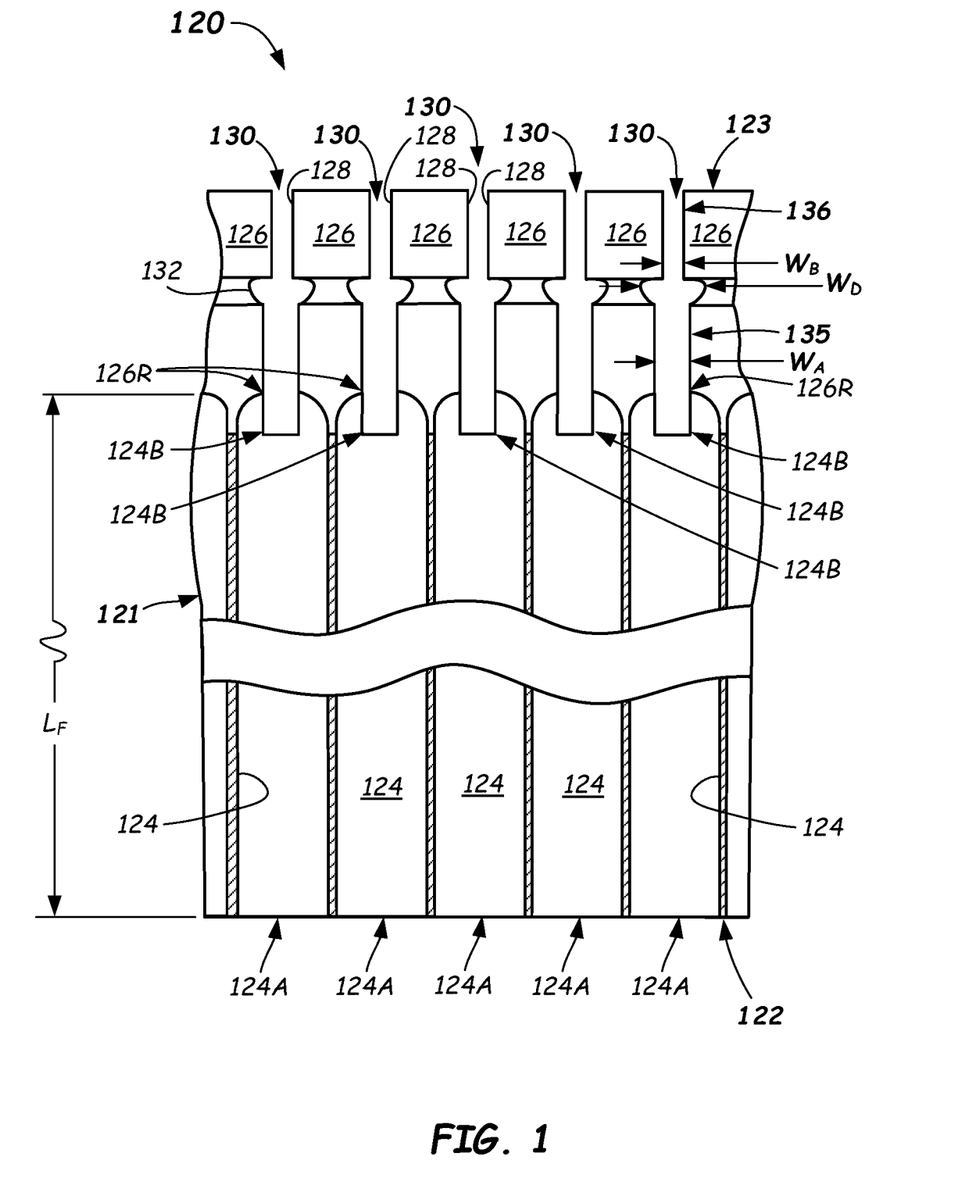
FIG. 1 schematically illustrates a cross-sectional side view of a representative portion a honeycomb extrusion die including a plurality of slots including slot entrance portions, slot exit portions, and intermediate divots wherein a width $W_A$ of the slot entrance portions is greater than a width $W_B$ of the slot exit portions according one or more embodiments of the disclosure.

Referring now to FIG. 1, a honeycomb extrusion die 120 is illustrated that comprises a die body 121. The die body 121 comprises an inlet face 122 and an exit face 123, which are axially opposite from each other. For example, in conjunction with FIGS. 2-3 described in more detail below, the inlet face 122 receives batch material, such as the batch material 216, via the action of an extruder, such as an extruder 200, and the exit face 123 discharges the batch material 216 reformed as a honeycomb structure 201.

Referring back to FIG. 1, the die body 121 comprises feedholes 124 extending in the die body 121 with feedhole entrances 124A at the inlet face 122 and feedhole outlets 124B within the body 121. A plurality of die pins 126 extend from the die body 121 to form the exit face 123. The plurality of die pins 126 comprise side surfaces 128 (a few labeled) that define a matrix of intersecting slots 130. The matrix of intersecting slots 130 corresponds to the extruded honeycomb structure 201, as the walls of the honeycomb structure 201 are formed from the batch material 216 as the batch material 216 is discharged from the slots 130 at the exit face 123.

Figure 6:
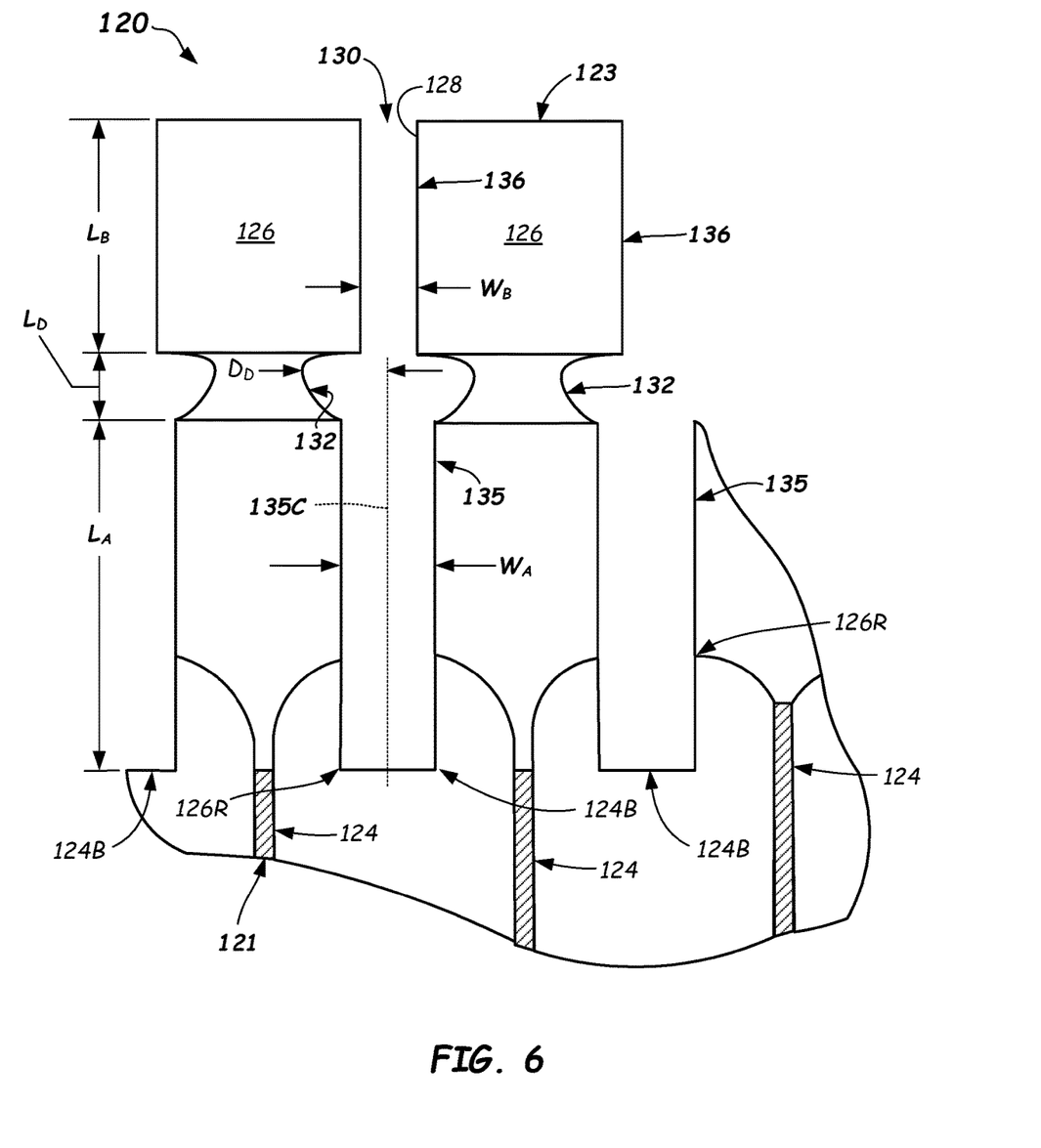
FIG. 6 schematically illustrates an enlarged cross-sectional side view of a representative portion of a honeycomb extrusion die showing a slot configuration including slot entrance portions, slot exit portions, and intermediate divots according to embodiments of the disclosure.

At least some of the slots 130 in the matrix of intersecting slots (such as all of the slots 130) comprise divots 132 formed in the side surfaces 128 of the die pins 126 at positions located between the outlets 124B of the feedholes 124 and the exit face 123. Accordingly, these intersecting slots 130 comprise entrance slot portions 135 of the matrix of intersecting slots 130 extending from intersections of the slots with the feedhole exits 124B to the divots 132. The entrance slot portions 135 have an entrance slot width $W_A$ measured transverse to the slot 130 as best shown in FIGS. 1 and 6. The intersecting slots 130 further comprise exit slot portions 136 located extending between the divots 132 and the exit face 123. The exit slot portions 136 have an exit slot width $W_B$, measured transverse to the slot 130 (perpendicular to the axial direction) as also shown in FIGS. 1 and 6. Since the batch material is discharged from the extrusion die 120 through the slots 130, the exit slot width $W_B$ of the exit slot portions 136 corresponds to the thickness of the walls 312 of the resulting honeycomb structure 201 and honeycomb body 203.

According to embodiments described herein, in order to set the highest wear area in the honeycomb extrusion die 120 to occur at the location of the exit slot portions 136, the configuration of the honeycomb extrusion die is made in some embodiments such that $W_A > W_B$ over an entire length of the slots 130. In other words, the entrance slot width $W_A$ for any location along an entrance length $L_A$ of the entrance slot portions 135 (from the intersections with the feed hole exits 124B to the divots 132, as shown in FIG. 6) is greater than the exit slot width $W_B$ for all locations along an exit length $L_B$ of the exit slot portions 136 (from the divots 132 to the exit face 123, as shown in FIG. 6).

Reference is now made to FIG. 2, which shows a cross-sectioned side view of a schematic example embodiment of an extruder 200 (e.g., a continuous twin-screw extruder). The extruder 200 includes the honeycomb extrusion die 120 according to embodiments of this disclosure mounted at a discharge end at a downstream side 210 of the extruder 200. The extruder 200 comprises a barrel 202 comprising a chamber 204 formed therein. The barrel 202 can be monolithic or it can be formed from a plurality of barrel segments connected successively in the longitudinal (e.g., axial) direction 240, which corresponds to the extrusion direction. The chamber 204 extends through the barrel 202 in the longitudinal direction 240 between an upstream side 208 and the downstream side 210. At, or proximate to, the upstream side 208 of the barrel 202, a material supply port 214 can be provided, which can comprise a hopper or other suitable material supply structure, for supplying a batch material 216 to the extruder 200. The honeycomb extrusion die 120 is provided at, and coupled to, the downstream side 210 of the barrel 202 for extruding the batch material 216 into a desired shape, such as honeycomb structure 201 or the like. Thus, the honeycomb structure 201 is illustrated in FIG. 2 as a green extrudate that is in the process of being extruded through the die 120. The honeycomb extrusion die 120 can be preceded by other extrusion components (not shown), such as one or more screen, orifices, homogenizers, flow control or bow control devices, or the like to facilitate the formation of desirable flow characteristics, such as a steady, uniform, and/or plug-type flow front before the batch material 216 reaches the honeycomb extrusion die 120. FIG. 3 is a schematic perspective illustration also showing the end of the extruder 200 at the downstream side 210 and the honeycomb structure 201 (e.g., an extrudate) being extruded therefrom.

The extruder 200 can be of any type, such as a ram extruder or a twin-screw extruder. For example, as shown in FIG. 2 the extruder 200 is a twin-screw extruder comprising a pair of extruder screws 230 mounted in the barrel 202. The first screw 230 and the second screw 232 may be arranged generally parallel to each other, as shown, although they may also be arranged at various angles relative to each other. The screws 230 can be coupled to a driving mechanism 236, which can be located outside of the barrel 202, for rotation in the same or different directions. Both the screws can be commonly coupled to a single driving mechanism 236 or, as shown, to individual driving mechanisms 236. The screws 230, ram, or other extrusion element moves the batch material 216 through the barrel 202 with pumping and/or mixing action in the axial direction 240. As shown in FIGS. 2-3, an extruder assembly or cartridge located proximate the downstream end 210 can comprise extrusion hardware such as the honeycomb extrusion die 120. A skin forming mask 205 can also be included for the honeycomb structure 201 with a peripheral outer skin. While extrusion is illustrated as being horizontally oriented in FIGS. 2 and 3, this disclosure is not so limited and extrusion can be horizontal, vertical, or at some incline thereto.

Figure 4:
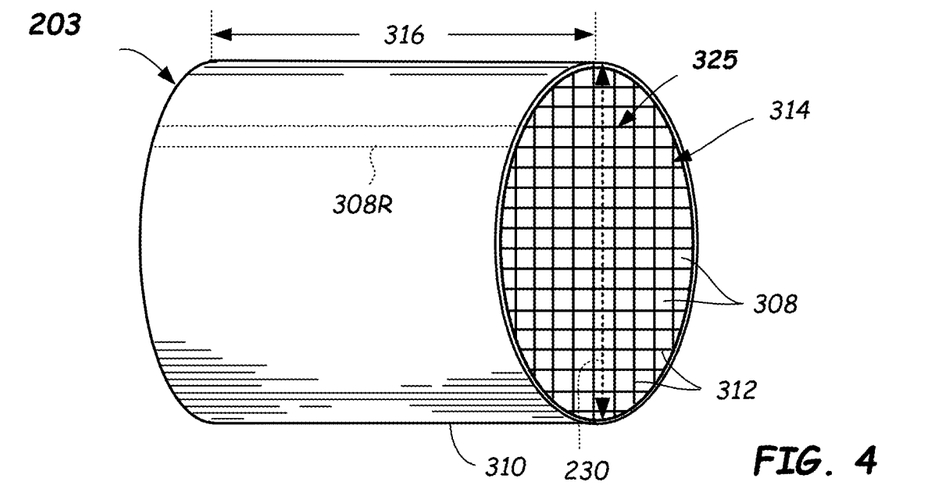
FIG. 4 schematically illustrates a perspective view of a representative honeycomb body comprising a honeycomb structure manufactures by extrusion through the honeycomb extrusion die according to embodiments of the disclosure.

When a desired length 316 is extruded, the green honeycomb structure 201 can be cut by any suitable means, such as via a wire, blade, saw, or the like to form a honeycomb body 203 as shown in FIG. 4. After cutting from the structure 201, the honeycomb body 203 is in a green state and can be dried and fired via conventional methods to form a porous ceramic honeycomb body. The resulting porous ceramic body can have generally the same shape and configuration as the green honeycomb body, e.g., subject to shrinkage (if any) or other dimensional changes during drying, firing, or other manufacturing steps. Thus, the honeycomb body 203 in FIG. 4 generally represents the honeycomb body in both the green state (before firing) and the ceramic state (after firing).

Upon exiting the extruder 200 in the axial direction 240, the green honeycomb structure 201, and therefore the honeycomb body 203 cut from the honeycomb structure 201, comprises a honeycomb matrix 325 of axially extending and intersecting walls 312 that form a plurality of axially extending channels 308. If the mask 205 is used, the honeycomb structure 201 can also comprise an axially extending outer peripheral surface 310 or the outer peripheral surface 310 can be applied to the honeycomb body 203 in a subsequent manufacturing step. The plurality of intersecting walls 312, shown intersecting at perpendicular angles, form the channels 308 that extend in the axial direction 240. For example, a representative channel 308R extending in the axial direction 240 is shown by dashed lines for illustration purposes. A cross-sectional shape of the green honeycomb structure 201 perpendicular to the axial direction 240 can be circular (as shown), square, elliptical, rectangular, triangular, hexagonal, octagonal, or any other polygonal shape. Similarly, the channels 308 can have any suitable cross-sectional shape, such as square (as shown), circular, elliptical, rectangular, triangular, hexagonal, octagonal, or any other polygonal shape. The channels 308 can be all of the same shape and/or size, or different shapes and/or sizes. Similarly, the walls 312 can be all of the same thickness or different thicknesses (set by the width of the slots of the extrusion die 120).

Average cell density of the honeycomb body 203 when in the porous ceramic state after firing, can be any suitable value, such as between about 100 cells per square inch (cpsi) and about 900 cpsi (between about 15.5 cells per square cm and about 139.5 cells per square cm). The intersecting walls 312 can have any suitable transverse wall thickness, such as ranging from about 3.0 mils to 60 mils (about 0.076 mm to 1.52 mm). For example, the geometries of the porous ceramic honeycomb body may have an average cell density of 400 cpsi with a wall thickness of about 8 mils ("400/8") or with a wall thickness of about 6 mils ("400/6"). Other geometries of the porous ceramic honeycomb body can include, for example, combinations of (average cell density {in cpsi})/(wall thickness {in mil}) of 100/17, 200/12, 200/19, 270/19, 200/8, 300/8, 350/7, 600/4, 400/4, 600/3, 900/3, and the like.

Accordingly, referring back to FIG. 1, FIG. 1 shows a partial, cross-sectional side view of a repeating structure of the honeycomb extrusion die 120 configured to form the intersecting walls 312. This repeating die structure can be repeated throughout the die body 121 of the honeycomb extrusion die 120 and/or arranged with areas having different slot widths, pin sizes, or pins per square inch.

Figure 5:
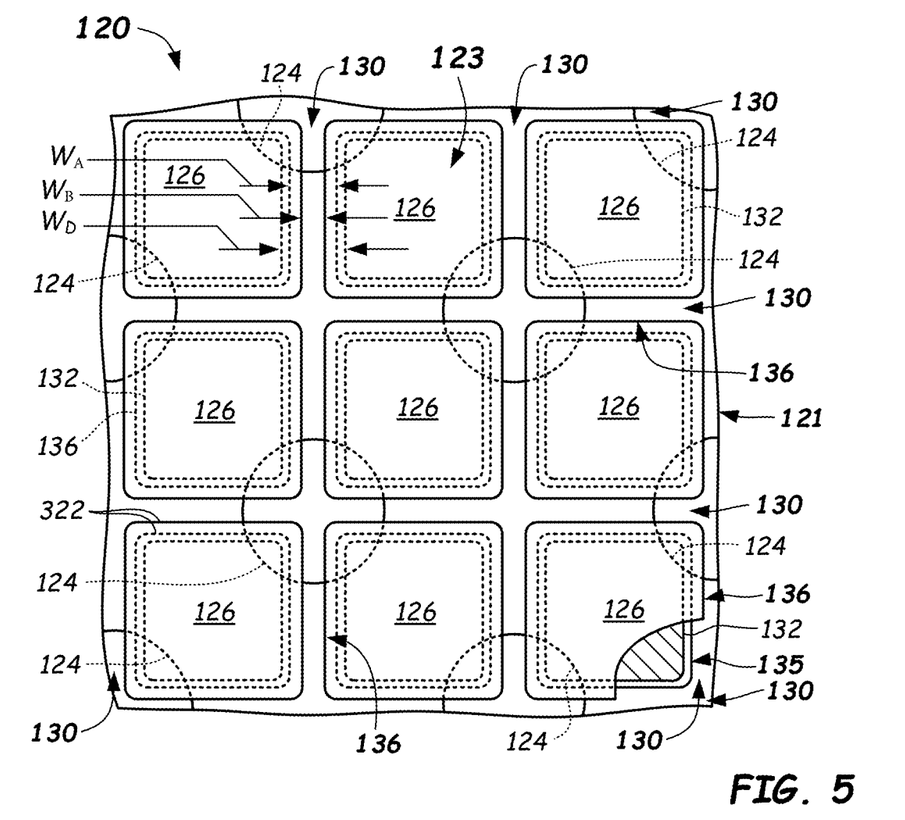
FIG. 5 schematically illustrates a enlarged, cross-sectioned, front plan view of a representative portion of a honeycomb extrusion die illustrating locations of a plurality of feedholes in fluid communication with the plurality of slots and with a representative die pin configuration including a cutout portion illustrating configurations of slot entrance portions, slot exit portions, and intermediate divots according to embodiments of the disclosure.

FIG. 5 shows an enlarged front view of a portion of the exit face 123 of the honeycomb extrusion die 120. For example, the view of FIG. 5 may be provided at a central region of the exit face 123 of the honeycomb extrusion die 120 and not necessarily at an area proximate to the periphery of the exit face 123 that is configured to form the outer peripheral surface 310. The inlet face 122 is located opposite the exit face 123. Die body 121 can be made from any suitable tool material, such as tool steel. Portions of the honeycomb extrusion die 120, such as the pin surfaces 128 defining the slots 130, can be coated with a wear-resistant coating material. As described generally above, batch material 216 (e.g., see FIG. 2) enters the feedhole inlets 124A (e.g., see FIG. 1) under pressure provided by the operation of the extruder 200 (e.g., see FIG. 2) and is discharged into the slots 130 at the feedhole outlets 124B.

The die pins 126 are arranged so that the side surfaces 128 (each pin 126 comprising four side surfaces 128 for square-shaped die pins 126 shown in FIG. 5) form the plurality of slots 130 defined between the respective opposing side surfaces 128 of the die pins 126. The slots 130 intersect with the feedhole outlets 124B of the feedholes 124 and extend axially to the exit face 123. There may be overlap between the feedholes 124 and the slots 130. During extrusion, the batch material 216 (e.g., see FIG. 2) flows through the slots 130 and forms the intersecting walls 312 (e.g., see FIGS. 3 and 4) when the batch material 216 is extruded through the honeycomb extrusion die 120.

In the embodiment depicted in FIGS. 1, 5 and 6, the die pins 126 are square-shaped when viewed from the exit face 123. The square-shaped die pins 126 form square-shaped channels 308 (as correspondingly shown in FIGS. 3 and 4). In other embodiments, the die pins 126 can have shapes other than square, such as circular, triangular, rectangular non-square, hexagonal, octagonal, diamond, combinations of the aforementioned, and the like and they can comprise filleted or radiused corners when viewed in transverse cross-section, e.g., to minimize stress in the final porous ceramic honeycomb body and/or reduce puddling of any catalyst coating applied thereto.

During use of the honeycomb extrusion die 120 in an extrusion process to form honeycomb green bodies, the batch material 216 is forced under pressure against the inlet face 122 and enters into the feedhole inlets 124A of the feedholes 124. The batch material 216 further flows in the feedholes 124 to the feedhole exits 124B and transitions into the slots 130. The structure of the slots 130 are defined by the plurality of die pins 126 extending to the exit face 123, wherein the plurality of die pins 126 comprising side surfaces 128 configured to define the matrix of intersecting slots 130.

At least some of the slots 130 of the matrix of intersecting slots 130 are made up of entrance slot portions 135, divots 132, and exit slot portions 136. In some embodiments, substantially all of the center region of the extrusion die 120, except for the skin-forming region, comprises the above structure. In some embodiments, even the skin-forming region at the periphery of the extrusion die 120 comprises the entrance slot portions 135, divots 132, and exit slot portions 136. In some embodiments, all of the matrix of intersecting slots 130 that define the walls 312 of the extruded honeycomb structure 201 and/or honeycomb body 203 comprise entrance slot portions 135, divots 132, and exit slot portions 136. In some embodiments, all of the matrix of intersecting slots 130 (thus, including any slots in a skin forming region of the die) comprise the entrance slot portions 135, divots 132, and exit slot portions 136.

In more detail, the plurality of die pins 126 comprise divots 132 formed in the side surfaces 128 of the die pins 126 between the feedhole outlets 124B and the exit face 123. Divots 132, as defined herein, are recessed portions at a transition between the entrance slot portions 135 and exit slot potions 136. In some embodiments of the honeycomb extrusion die 120, the divots 132 formed in the side surfaces 128 of the die pins 126 may have a divot width $D_D$ of from 250 μm to 750 μm as measured from a centerline 135C of the entrance slot portions 135 to the deepest part of the divot 132 in a direction perpendicular to the axial direction. Since the divot width $D_D$ is measured from the centerline 135C of the slot portions 135, the total or maximum width of the slots at the divots 132, designated in FIG. 1 as divot slot width $W_D$, is equal to twice the divot width $D_D$. The divot slot width $W_D$ is wider than both the entrance slot width $W_A$ and the exit slot width $W_B$. In some embodiments, the divots 132 have a divot length $L_D$ of from 200 μm to 600 μm. Divots 132 can have a bottom configuration with a compound radius such as shown in FIG. 6. Other honeycomb dies can have other divot configurations, such as the extrusion die 120B having square-shaped divots 132B of the sides 128 of die pins 126 shown in FIG. 7B, such that the sides of the divot 132B is flat.

The entrance slot portions 135 of the matrix of intersecting slots 130 are positioned between intersections with the feedhole outlets 124B and the divots 132, whereas the exit slot portions 136 of the matrix of intersecting slots 130 are located between the divots 132 and the exit face 123. As described above, the entrance slot portions 135 have the entrance slot width $W_A$, and the exit slot portions 136 having the exit slot width $W_B$. $W_A$ and $W_B$ can be measured as the dimensions of the slots as coated with a wear resistant coating.

A relationship between $W_A$ and $W_B$ can be set to control or influence the high wear area of the honeycomb extrusion die 120 to occur at the exit slot portions 136, irrespective of the batch material used. In particular, in some embodiments, the respective entrance slot portions 135, and exit slot portions 136 are sized such that $W_A > W_B$ over the entire length of the slots 130. That is, the entrance slot width $W_A$ for any location along an entrance length $L_A$ of the entrance slot portions 135 (from the intersections with the feed hole exits 124B to the divots 132, as shown in FIG. 6) is greater than the exit slot width $W_B$ for all locations along an exit length $L_B$ of the exit slot portions 136 (from the divots 132 to the exit face 123, as shown in FIG. 6).

According to some embodiments, the relationship between $W_A$ and $W_B$ is further set or defined with respect to a slot width contraction ratio (SWCR), where the slot width contraction ratio is defined as SWCR=$W_A/W_B$. In some embodiments, at least some of the matrix of intersecting slots 130 have a SWCR that is greater than or equal to 1.5. For example, the SWCR can be used to adjust the relative amounts of slip velocity of the batch material at a first location at the intersection of feedholes 124 and entrance slot portions 135, and a second location at the exit slot portions 136. In some embodiments of the honeycomb extrusion die 120, the slot width contraction ratio (SWCR) is greater than 3.0. In some embodiments, SWCR values less than or equal to 1.05 may result in unwanted wear at the die pin root for some batch materials, while values of SWCR greater than 5.0 may cause excessive wear at the exit slot portions and thus premature wearing out of the honeycomb extrusion die. In some embodiments of the honeycomb extrusion die 120, the SWCR can be from 2.0 to 5.0, such as from 3.0 to 5.0. Adjusting the relative amounts of slip velocity in the honeycomb extrusion die 120 is useful in die designs wherein the exit slot width $W_B$ of individual slots is from 40 μm to 250 μm, although it may be useful on honeycomb extrusion dies with different exit slot widths.

Regarding further dimensions of the slots 130 of the honeycomb extrusion die 120, at least some of the entrance slot portions 135 have the entrance length $L_A$ as measured between the intersections with the feed hole exits 124B and the divots 132 (e.g., see FIG. 6), and at least some of the exit slot portions 135 have the exit length $L_B$ as measured between the divots 132 and the exit face 123 (e.g., see FIG. 6), and wherein entrance length $L_A$ is greater than the exit length $L_B$. Having an entrance length $L_A$ greater than the exit length $L_B$ may assist in some embodiments to provide a die pressure reduction. In some embodiments, the entrance length $L_A$ is greater than or equal to 1.1 times the exit length $L_B$, or $L_A \geq 1.1\ L_B$.

Furthermore, the entrance length $L_A$ of at least some of the entrance slot portions 135 in some embodiments is from 1270 μm to 2540 μm, as measured between the feedhole outlets 124B and the divots 132 as shown in FIG. 6. In some embodiments, at least some of the exit slot portions 135 have an exit length $L_B$ from 508 μm to 1143 μm, as measured between the divots 132 (downstream end thereof) and the exit face 123 as shown in FIG. 6.

In some embodiments, the entrance slot width $W_A$ of the entrance slot portions 135 is a constant dimension along the entire length $L_A$ of the entrance slot portions 135. Similarly, in some embodiments, the exit slot width $W_B$ of the exit slot portions 136 is a constant dimension along the entire length $L_B$ of the exit slot portions 136. However, the width of the slots 130 along the entrance slot portions 135 and/or the exit slot portions 136 can be non-constant for some or all of slots 130.

Figure 7A:
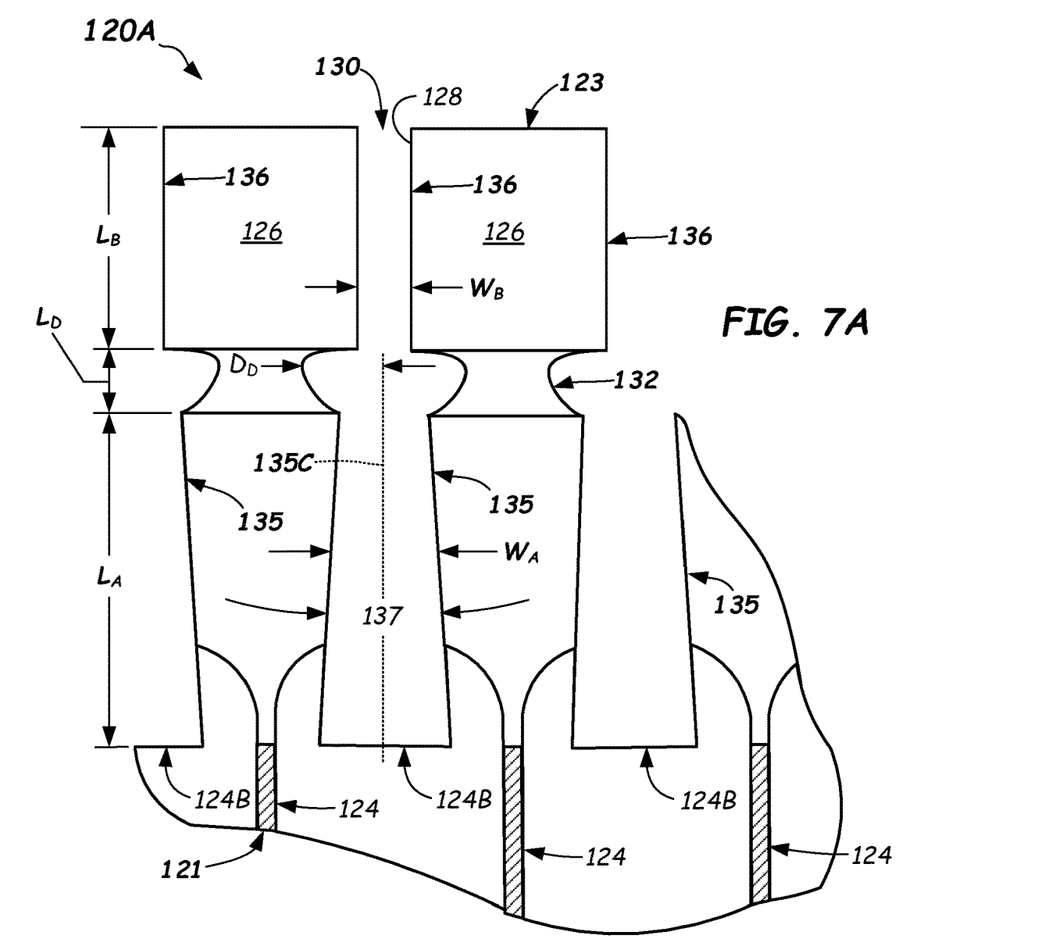
FIG. 7A schematically illustrates an enlarged cross-sectional side view of a representative portion of an alternative embodiment of a honeycomb extrusion die including tapered slot entrance portions according to some embodiments of the disclosure.
Figure 7B:
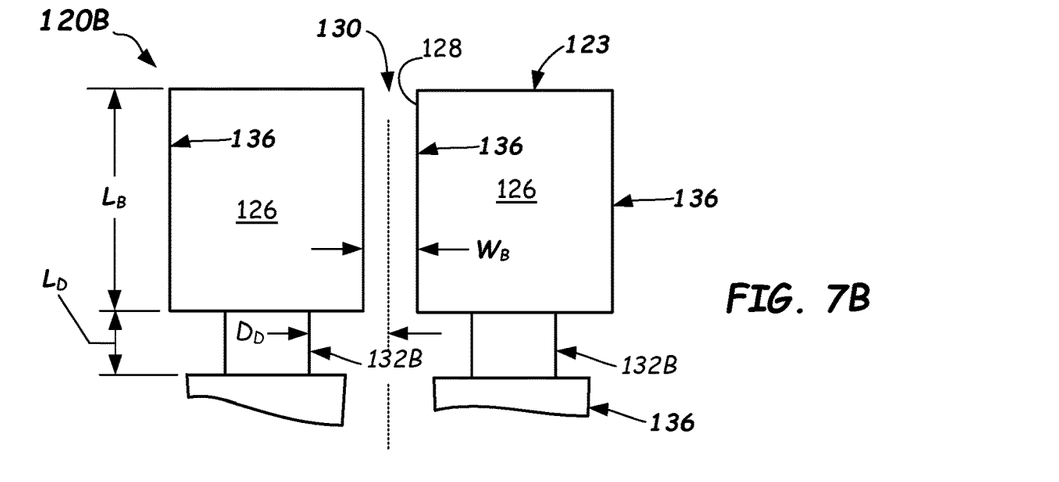
FIG. 7B schematically illustrates an enlarged partial cross-sectional side view of a representative portion of an alternative embodiment of a honeycomb extrusion die including square divot shapes according to some embodiments of the disclosure.

For example, in one alternative embodiment of the extrusion die 120, designated as the extrusion die 120A and shown in FIG. 7A, the entrance slot width $W_A$ of the entrance slot portion 135 is non-constant along its length $L_A$ from the feedhole exits 124B to the upstream side of the divot 132. As such, the entrance slot portion 135 has tapered walls forming a wedge shape in plan view shown in FIG. 7A. Others of the slots 130 can also have tapered walls and a wedge shaped configuration. A taper angle 137 measured between the walls as shown in FIG. 7A can be from about 0.1 degrees to 10.0 degrees, for example. The other dimensions of $W_B$ and $L_A$, $L_B$, and $L_D$ and $D_D$ can be the same as described above. In this embodiment, $W_A > W_B$ at each location along the length $L_A$, and thus, even the minimum dimension of $W_A$ is greater than the width $W_B$ at any location along the exit slot portion 136.

The honeycomb extrusion die 120, comprising the slot configurations with entrance slot portion 135, divots 132, and exit slot portions 136 can be manufactured in any suitable manner. In some embodiments, the die 120 is manufactured by a wire-electrical discharge machining (wire-EDM) technique and thereafter coated with a suitable wear coating to achieve the desired dimensions of $W_A$ and $W_B$.

Figure 8:
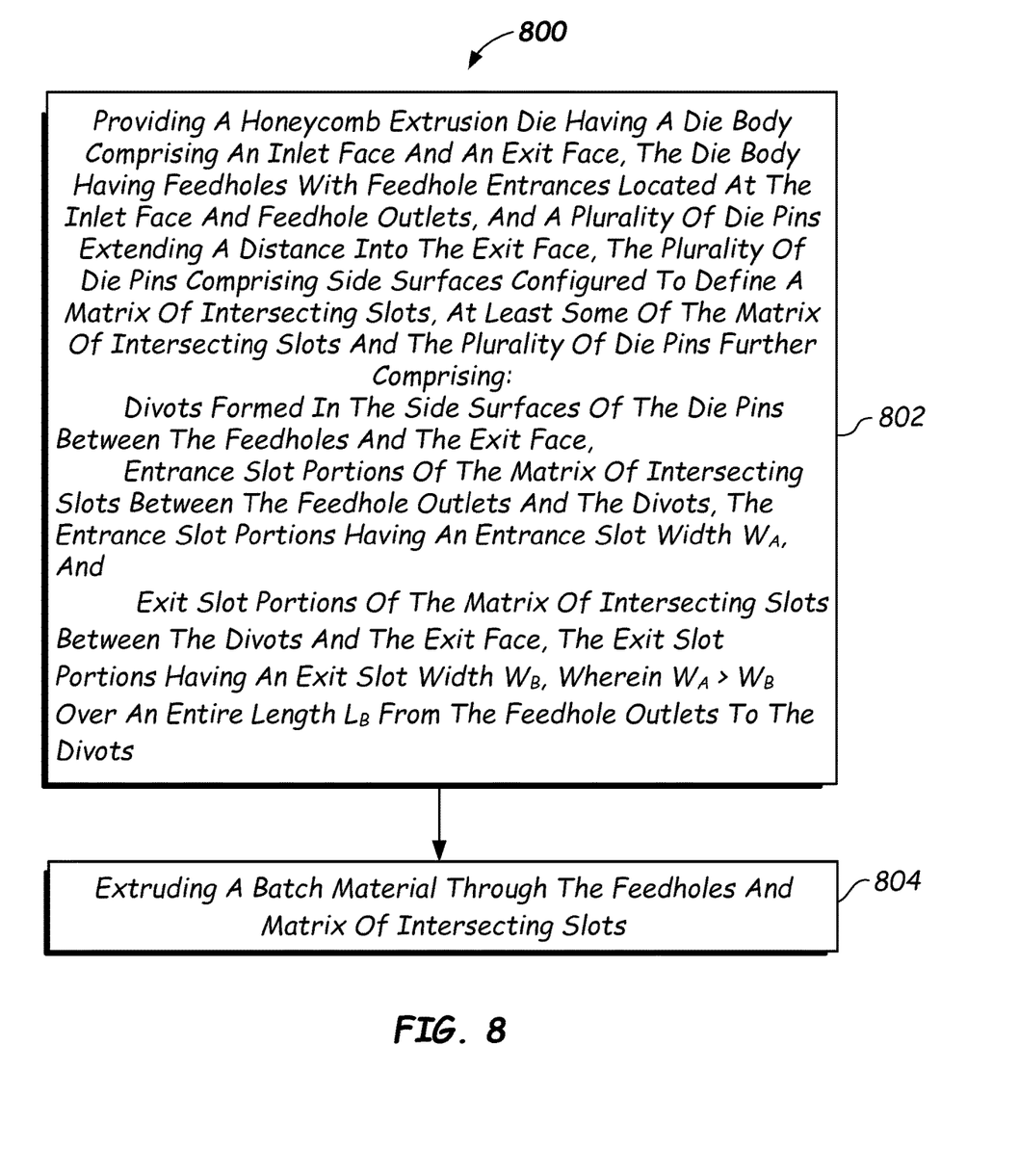
FIG. 8 schematically illustrates flowchart describing a method of manufacturing a honeycomb structure using a honeycomb extrusion die containing slot entrance portions, slot exit portions, and intermediate divots according to embodiments of the disclosure according to embodiments of the disclosure.

In another aspect, a method of manufacturing a honeycomb body (e.g., honeycomb body 203) is disclosed. Reference is made to FIG. 8, which shows a flowchart of the manufacturing method 800. In particular, FIG. 8 describes a method of manufacturing a honeycomb structure (e.g., honeycomb structure 201) using a honeycomb extrusion die (e.g., any of the honeycomb extrusion dies 120, including the honeycomb extrusion dies 120A, 120B of FIGS. 7A and 7B).

The method 800 comprises, in block 802, providing a honeycomb extrusion die 120 comprising a die body (e.g., die body 121) comprising an inlet face (e.g., inlet face 122) and an exit face (e.g., exit face 123), the die body having feedholes (e.g., feedholes 124) with feedhole entrances (e.g., feedhole entrances 124A) located at the inlet face and feedhole outlets (e.g., feedhole outlets 124B), and a plurality of die pins (e.g., die pins 126) extending a distance into the exit face, the plurality of die pins comprising side surfaces (e.g., side surfaces 128) configured to define a matrix of intersecting slots (e.g., intersecting slots 130), at least some of the matrix of intersecting slots and the plurality of die pins further comprising divots (e.g., divots 132) formed in the side surfaces of the die pins between the feedholes and the exit face, entrance slot portions (e.g., entrance slot portions 135) of the matrix of intersecting slots between the feedhole outlets and the divots, the entrance slot portions having an entrance slot width $W_A$, and exit slot portions (e.g., exit slot portions 136) of the matrix of intersecting slots between the divots and the exit face, the exit slot portions having an exit slot width $W_B$, wherein $W_A > W_B$ over an entire length of the slots 130.

The method 800 further comprises, in block 804, extruding a batch material (e.g., batch material 216) through the feedholes and matrix of intersecting slots. According to the method 800, a position of maximum die wear from the extruding of the batch material is located at the exit slot portions of the matrix of intersecting slots, and this occurs regardless of the rheology of the batch material, i.e., whether the batch material is a high die wear batch mixture or a low die wear batch mixture.

It will be apparent to those skilled in the art that various modifications and variations can be made in the present disclosure without departing from the scope of the disclosure. Thus, it is intended that the appended claims cover the modifications and variations of this disclosure provided they come within the scope of the appended claims and their equivalents.

What is claimed is:

1. A honeycomb extrusion die, comprising:
   a die body comprising:
   an inlet face and an exit face axially opposite from the inlet face;
   feedholes with feedhole entrances at the inlet face that terminate at feedhole outlets within the die body; and
   a plurality of die pins extending to the exit face, the plurality of die pins comprising side surfaces that define a matrix of intersecting slots,
   wherein at least some of the slots in the matrix of intersecting slots comprise:
   divots formed in the side surfaces of the die pins at positions located axially between the feedhole outlets and the exit face,
   entrance slot portions extending from intersections with the feedhole outlets to the divots, the entrance slot portions having an entrance slot width $W_A$, and
   exit slot portions extending from the divots to the exit face, the exit slot portions having an exit slot width $W_B$,
   wherein $W_A > W_B$ over an entire slot length from the feedhole outlets to the exit face.

2. The honeycomb extrusion die of claim 1, comprising a slot width contraction ratio SWCR over the entire slot length of the at least some of the slots of the matrix of intersecting slots is greater than or equal to 1.5, wherein the SWCR is defined as $SWCR = W_A/W_B$.

3. The honeycomb extrusion die of claim 2, wherein the SWCR is greater than or equal to 3.0.

4. The honeycomb extrusion die of claim 2, wherein the SWCR is from 1.5 to 5.0.

5. The honeycomb extrusion die of claim 4, wherein the SWCR is from 3.0 to 5.0.

6. The honeycomb extrusion die of claim 1, wherein the exit slot width $W_B$ of the at least some of the slots of the matrix of intersecting slots is from 40 µm to 250 µm.

7. The honeycomb extrusion die of claim 1, wherein the entrance slot width $W_A$ of at least some of the entrance slot portions is a constant dimension along an entire length of the entrance slot portions from the intersections with the feedhole outlets to the divots.

8. The honeycomb extrusion die of claim 1, wherein the exit slot width $W_B$ of at least some of the exit slot portions is a constant dimension along an entire length of the exit slot portions from the divots to the exit face.

9. The honeycomb extrusion die of claim 1, wherein the divots formed in the side surfaces of the die pins have a divot width of from 250 µm to 750 µm measured from a centerline of the entrance slot portions.

10. The honeycomb extrusion die of claim 1, wherein the divots formed in the side surfaces of the die pins have a divot length $L_D$ of from 200 µm to 600 µm.

11. The honeycomb extrusion die of claim 1, wherein the entrance slot portions have an entrance length $L_A$ as measured between the intersections with the feedhole outlets and the divots, and the exit slot portions have an exit length $L_B$ as measured between the divots and the exit face, and wherein $L_A > L_B$.

12. The honeycomb extrusion die of claim 11, wherein the entrance length $L_A$ is from 1270 µm to 2540 µm.

13. The honeycomb extrusion die of claim 11, wherein the exit length $L_B$ is from 508 µm to 1143 µm.

14. The honeycomb extrusion die of claim 11, wherein $L_A \geq 1.1 \, L_B$.

15. The honeycomb extrusion die of claim 14, wherein a slot width contraction ratio SWCR of the at least some of the slots of the matrix of intersecting slots is greater than or equal to 1.5, wherein the SWCR is defined as $SWCR = W_A/W_B$.

16. The honeycomb extrusion die of claim 1, wherein the entrance slot portions have an entrance length $L_A$ from 1270 µm to 2540 µm as measured between the intersections with the feedhole outlets and the divots, the exit slot portions have an exit length $L_B$ from 508 µm to 1143 µm as measured between the divots and the exit face, and the divots formed in the side surfaces of the die pins have a divot width $D_D$ from 250 µm to 750 µm measured from a centerline of the entrance slot portions, and a divot length $L_D$ from 200 µm to 600 µm.

17. A method of manufacturing a honeycomb structure, comprising:

extruding a batch material through the extrusion die of claim 1.

18. The method of manufacturing the honeycomb structure of claim 17, wherein a position of maximum die wear from the extruding is located at the exit slot portions of the slots of the matrix of intersecting slots.

19. The method manufacturing the honeycomb structure of claim 17, wherein the position of maximum die wear from the extruding is located at the exit slot portions of the slots of the matrix of intersecting slots regardless of a rheology of the batch material.

20. A method of fabricating a honeycomb extrusion die, comprising:
- creating feedholes in a die body, wherein the feedholes extend from feedhole entrances at an inlet face of the die body to feedhole outlets within the die body;
- creating a matrix of intersecting slots that extends axially into the die body from an exit face of the die body that is axially opposite to the inlet face, wherein the slots are defined by side surfaces of die pins extending to the exit face, and
- forming divots in the side surfaces of the die pins at positions located axially between the feedhole outlets and the exit face,
- wherein creating the matrix of intersecting slots comprises forming at least some of the slots with entrance slot portions having an entrance slot width $W_A$ extending from intersections with the feedhole outlets to the divots, and with exit slot portions having an exit slot width $W_B$ extending from the divots to the exit face, wherein $W_A > W_B$ over an entire slot length from the feedhole outlets to the exit face.

* * * * *